(12) United States Patent
Vetter et al.

(10) Patent No.: US 11,020,849 B2
(45) Date of Patent: Jun. 1, 2021

(54) HANDHELD TOOL CASE

(71) Applicant: Robert Bosch GmbH, Stuttgart (DE)

(72) Inventors: Joerg Vetter, Stuttgart (DE); Josef Baumgartner, Wildberg (DE); Hansjoerg Beutel, Pfullingen (DE); Jan Breitenbach, Stuttgart (DE); Juergen Luginsland, Waldenbuch (DE); Peter Pozsega, Kaposvar (HU)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/531,894

(22) PCT Filed: Dec. 2, 2015

(86) PCT No.: PCT/EP2015/078286
§ 371 (c)(1),
(2) Date: May 31, 2017

(87) PCT Pub. No.: WO2016/096414
PCT Pub. Date: Jun. 23, 2016

(65) Prior Publication Data
US 2017/0259424 A1 Sep. 14, 2017

(30) Foreign Application Priority Data

Dec. 17, 2014 (DE) .......................... 102014226234.8

(51) Int. Cl.
*B25H 3/00* (2006.01)
*H02J 7/00* (2006.01)
(Continued)

(52) U.S. Cl.
CPC .............. *B25H 3/006* (2013.01); *B65D 25/10* (2013.01); *B65D 43/14* (2013.01); *H02J 7/00* (2013.01); *H02J 7/0044* (2013.01)

(58) Field of Classification Search
CPC .......... B25H 3/006; B25H 3/02; B65D 25/10; B65D 25/101; B65D 51/26; H02J 7/0044; H02J 7/025; H02J 5/005
(Continued)

(56) References Cited

U.S. PATENT DOCUMENTS

| 4,811,713 A | 3/1989 | Shimada et al. |
| 5,219,446 A | 6/1993 | Klepac |

(Continued)

FOREIGN PATENT DOCUMENTS

| CN | 101554723 A | 10/2009 |
| CN | 202781112 U | 3/2013 |

(Continued)

OTHER PUBLICATIONS

International Search Report dated Feb. 29, 2016, of the corresponding International Application PCT/EP2015/078286 filed Dec. 2, 2015.

*Primary Examiner* — Mollie Impink
(74) *Attorney, Agent, or Firm* — Norton Rose Fulbright US LLP; Gerard Messina

(57) ABSTRACT

A handheld tool case including at least one base unit, which includes at least one side wall, and at least one cover unit, which is intended to indirectly or directly delimit, with the base unit, a case interior for the storage and/or transportation of at least one transportation object. It is provided that the handheld tool case includes a positioning unit, which, in at least one operating state, during a closing movement between the base unit and the cover unit, converts a closing force into a positioning force on the at least one transportation object, which has at least one component in the direction of the side wall.

16 Claims, 7 Drawing Sheets

(51) Int. Cl.
*B65D 25/10* (2006.01)
*B65D 43/14* (2006.01)

(58) Field of Classification Search
USPC .......................................... 206/207, 349–383
See application file for complete search history.

(56) References Cited

U.S. PATENT DOCUMENTS

2014/0327396 A1* 11/2014 Rejman ................. H01M 10/44
                                                           320/108
2014/0353191 A1* 12/2014 DeCicco ................. B25H 3/006
                                                           206/373

FOREIGN PATENT DOCUMENTS

| | | |
|---|---|---|
| DE | 20108642 U1 | 8/2001 |
| DE | 202007018372 U1 | 6/2008 |
| DE | 102011086799 A1 | 5/2013 |
| DE | 102011086874 A1 | 5/2013 |
| EP | 2540453 A2 | 1/2013 |
| EP | 3031584 A1 | 6/2016 |
| JP | S63117140 A | 5/1988 |
| JP | H02100516 U | 8/1990 |
| JP | H0733584 A | 2/1995 |
| JP | 2013006254 A | 1/2013 |
| WO | 2014079687 A1 | 5/2014 |
| WO | WO-2014079687 A1 * | 5/2014 ............... B25H 3/02 |

* cited by examiner

HANDHELD TOOL CASE

BACKGROUND INFORMATION

A conventional handheld tool case may have at least one base unit, which includes at least one side wall, and at least one cover unit, which is provided to indirectly or directly delimit, with the base unit, a case interior for storage and/or transportation of at least one transportation object.

SUMMARY

The present invention is directed to a handheld tool case. In an example embodiment, the handheld tool case has at least one base unit, which includes at least one side wall, and at least one cover unit, which is provided to indirectly or directly delimit, with the base unit, a case interior for storage and/or transportation of at least one transportation object.

It is provided that the handheld tool case includes a positioning unit, which, in at least one operating state, during a closing movement between the base unit and the cover unit, converts a closing force into a positioning force on the at least one transportation object, which has at least one essential component in the direction of the side wall.

A handheld tool case may thus be provided for particularly precise positioning of the transportation object. A high efficiency for wireless energy transmission to the transportation object may be achieved. A simply designed positioning unit for positioning the transportation object may be provided. A successful arrangement of the transportation object in a predetermined position may be indicated to the user particularly reliably. A "handheld tool case" is to be understood in this context in particular as a manually portable case, which is provided to protect the transportation object stored in the case interior or a plurality of transportation objects from dust, moisture, mechanical action, and/or further environmental influences. The base unit and/or the cover unit preferably form a shell, which encloses the case interior in a closed state of the handheld tool case. It is possible that the case includes an intermediate unit, which is connected to the base unit and/or to the cover unit, and which delimits the case interior. It is possible that the handheld tool case includes a plurality of both base units and/or cover units. It is also possible that the handheld tool case includes exactly one base unit and exactly one cover unit. The handheld tool case is preferably intended to store the transportation object for wirelessly transmitting energy into the transportation object. The handheld tool case is preferably intended to be used in a holding device, which is intended to provide energy for the wireless energy transmission. The holding device is preferably intended for installation on a building wall, on a vehicle wall, on a framework, or in a shelf. "Wireless energy transmission" is to be understood in this context in particular as inductive energy transmission for charging an energy storage unit. A "transportation object" is to be understood in this context in particular as an object which is removable for use from the handheld tool case, preferably a handheld power tool, a rechargeable battery device of a handheld power tool, a charging device for a handheld power tool, or another accessory part. The transportation object is preferably intended for receiving energy wirelessly. The handheld tool case is preferably intended for storing and/or transporting at least two transportation objects, which are intended for receiving energy wirelessly. A "handheld power tool" is to be understood in this context in particular as a portable machine, which has at least one electrical drive unit, for example, a power drill, a hammer drill and/or percussion hammer, a saw, a plane, a screwdriver, a milling tool, a grinder, an angle grinder, a garden tool, for example, a hedge trimmer, and/or a multifunction tool. A "rechargeable battery device" is to be understood in this context in particular as a device which is intended for providing electrical energy, in particular for the electrical drive unit of the handheld power tool. The rechargeable battery device preferably includes at least one chargeable electrical energy storage unit, which has an electrochemical cell, for example. The rechargeable battery device is preferably intended for mechanical and electrical, detachable coupling to a handheld power tool. It is also possible that the rechargeable battery device is permanently connected to a handheld power tool. The cover unit is preferably formed at least essentially flat and/or has a closing edge situated at least essentially in a closing plane, which is intended for contact with the base unit. A "side wall" is to be understood in this context in particular as a wall which, at least in a closed state of the cover unit, is situated at least essentially perpendicular to the cover unit and/or to a closing plane defined by the closing edge of the cover unit. The side wall preferably delimits the case interior. "At least essentially perpendicular" is to be understood in this context in particular to mean that the side wall and the cover unit and/or the closing plane enclose an angle which deviates from 90° by less than 60°, preferably by less than 30°, more preferably by less than 10°, and particularly preferably by less than 5°. A "closing movement" is to be understood in this context in particular as a relative movement of the cover unit in relation to the base unit, which transfers the cover unit from an open state into a closed state, in which the cover unit and the base unit indirectly or directly delimit the case interior. The closing movement may be a swivel movement, a placement movement, or a sliding movement, i.e., it may include a rotation and/or a linear movement. A "closing force" is to be understood in this context in particular as a force which causes the closing movement and/or holds the cover unit in a closed state in relation to the base unit. The closing force is preferably applied by a user and/or provided by a closing unit, which preferably connects the cover unit and the base unit to one another in a form-locked and/or friction-locked manner in the closed state. A "positioning force" is to be understood in this context in particular as a force which acts on the at least one transportation object at least in a closed state of the cover unit and which moves the at least one transportation object in relation to the base unit, in particular in relation to the side wall, and/or holds it in a position in relation to the base unit, in particular in relation to the side wall. An "essential component" in the direction of the side wall is to be understood in this context as a reliably occurring component, i.e., in particular in contrast to a randomly occurring component. The component is preferably sufficient to displace the at least one transportation object in the direction of the side wall. An absolute value of the component advantageously deviates by less than 75%, preferably by less than 50%, more preferably by less than 25%, and particularly preferably by less than 10% from a total absolute value of the positioning force. "Intended" is to be understood in particular as specially designed and/or equipped. An object being intended for a certain function is to be understood in particular to mean that the object fulfills and/or carries out this certain function in at least one use and/or operating state.

In one advantageous embodiment, the positioning force has at least one component in the direction of a predetermined charging position of the at least one transportation object. A handheld tool case having a charging position may thus be provided, in which the transportation object may receive energy particularly efficiently. An amount of energy provided for an energy transmission may thus be kept particularly small. An efficiency level required for a charging process in a motor vehicle may be achieved. A particularly brief charging process may be achieved. A high level of user convenience may be achieved. The positioning force, in at least one operating state, preferably moves the at least one transportation object during the closing movement into the predetermined charging position or holds the transportation object in the predetermined charging position. A "predetermined charging position" is to be understood in this context in particular as a predetermined position of the at least one transportation object in the case interior, in which the transportation object is situated in an optimized way for a charging process. An arrangement in relation to the side wall is preferably defined in the predetermined charging position. A distance between the at least one transportation object and the side wall is preferably defined in the predetermined charging position. The transportation object is preferably situated close to the side wall in the charging position. The transportation object is preferably intended to receive energy and/or be charged with the aid of wireless energy transmission in the predetermined charging position. A distance between the transportation object in the charging position and the side wall is preferably less than 2 mm, preferably less than 1 mm, and particularly preferably less than 0.5 mm. The transportation object is preferably in contact with the side wall in the predetermined charging position. The transportation object preferably has a charging side which is intended to be in contact with the side wall in the predetermined charging position.

The handheld tool case advantageously includes a positioning unit, which is intended to move the transportation object toward the side wall and/or align it in relation to the side wall. An efficiency of the wireless energy transmission may thus be increased further. A volume of the case interior may be used particularly efficiently. The positioning unit, which is intended to move the transportation object toward the side wall and/or align it in relation to the side wall, and the positioning unit, which, in at least one operating state, during a closing movement between the base unit and the cover unit, converts a closing force into a positioning force on the at least one transportation object, which has at least one essential component in the direction of the side wall, are preferably formed completely integrally. Alternatively, the handheld tool case may also have two positioning units designed at least partially separately from one another. The positioning force is preferably intended to move the at least one transportation object in the direction of the side wall and to reduce a distance between the transportation object and the side wall. "Align" is to be understood in this context in particular to mean that the positioning unit is intended to rotate the at least one transportation object in relation to the side wall. The transportation object preferably has a flat charging side, which aligns the positioning unit in at least one operating state parallel to the side wall. The transportation object preferably has at least one secondary coil and the positioning unit is intended to align an axis of the secondary coil for a charging process in parallel to and/or flush with an axis of a primary coil, which is situated outside the side wall.

Furthermore, it is provided that the positioning unit, in at least one operating state, during a closing movement between the base unit and the cover unit, converts a closing force into a clamping force on the at least one transportation object, which has at least one essential component in the direction of the side wall. The at least one transportation object may thus be stored particularly reliably and securely in the case interior. A probability of an unfavorable arrangement of the transportation object may be kept low. A "clamping force" is to be understood in this context in particular as a force due to a wedge action and/or due to an elastic deformation. The clamping force is preferably intended to press the at least one transportation object against the side wall.

In one advantageous embodiment, the positioning unit has at least one active surface, which is intended to interact with a corresponding active surface of the at least one transportation object and which includes a surface normal having a component in the direction of the side wall. A positioning force including an essential component in the direction of the side wall may thus be generated with a simple design. The at least one active surface of the positioning unit and the corresponding active surface of the at least one transportation object are preferably aligned at least essentially in parallel to one another at least in a closed state of the cover unit. The active surfaces are preferably intended to slide past one another. The active surfaces preferably have a smooth surface. The at least one active surface of the positioning unit and the active surface of the at least one transportation object are preferably in contact with one another in an inserted state of the transportation object in the case. It is also possible that the handheld tool case, in an inserted state of the transportation object, has play between the at least one active surface of the positioning unit and the active surface of the at least one transportation object. The play is preferably less than 1 mm, preferably less than 0.5 mm, and particularly preferably less than 0.1 mm. The surface normal of the active surface of the positioning unit and the surface normal of the side wall preferably enclose an angle greater than 120°, preferably greater than 140°, and particularly preferably greater than 160°. The positioning unit preferably forms a wedge drive together with the at least one transportation object. A "wedge drive" is to be understood in this context in particular as a device which has at least two elements, which are movably supported in relation to one another, each having a sliding point, and which, with the aid of a sliding movement of the elements toward one another, converts an at least essentially linear movement of a first of the elements into an at least essentially linear movement of a further of the elements, which encloses an angle not equal to zero with the movement of the first of the elements.

The at least one active surface is advantageously formed as an inclined surface. A wedge action and a clamping force linked thereto may thus be achieved with a simple design. An "inclined surface" is to be understood in this context in particular as a surface which is situated neither perpendicular nor parallel in relation to the cover unit and/or a closing plane defined by a closing edge of the cover unit. The inclined surface and the cover unit and/or the closing plane preferably enclose an angle which deviates from 45° by less than 40°, preferably less than 20°, and particularly preferably less than 10°.

In one advantageous embodiment, the handheld tool case includes a bearing unit, which has a swivel axis, about which the cover unit and the base unit are swivelably supported in relation to one another for the closing movement. A particularly convenient closing movement may thus be achieved. The transportation object may advantageously be positioned via a lever action. The at least one active surface is preferably situated in parallel to the swivel axis. "Swivelable" is to be understood in this context in particular as rotatable over a limited angle range. The swivel axis is preferably situated in an edge area of the cover unit and/or in an edge area of the base unit. The swivel axis is preferably situated at least essentially in parallel to the side wall. It is also possible that the swivel axis is situated at least essentially perpendicularly to the side wall. "At least essentially perpendicularly" is to be understood in this context in particular as enclosing an angle which deviates from 90° by less than 10°, preferably less than 7°, and particularly preferably less than 2°.

Furthermore, it is provided that the positioning force has an essential component aligned in the radial direction in relation to the swivel axis. A simply designed positioning unit may thus be provided. A closing movement of the cover unit may be used particularly effectively for positioning of the at least one transportation object. The component of the positioning force is preferably oriented in the direction toward the swivel axis. It is possible that the positioning force is oriented in the direction away from the swivel axis. It is also possible that the positioning force has an essential component which is aligned in parallel to the swivel axis.

Furthermore, it is provided that the positioning unit has at least one positioning means, which is attached to the cover unit in an installed state. A positioning unit may thus be provided, which is intended to convert a closing force during a closing movement of the cover unit directly into a positioning force on the at least one transportation object. "Attached" is to be understood in this context in particular as kinematically coupled, preferably fixedly connected and/or integrally formed. The positioning means and the cover unit are preferably formed as two single parts. It is possible that the positioning means is intended, in particular during an installation and/or during a configuration, to be connected to the cover unit in various positions, i.e., for example, screwed, pinned, latched, plugged, and/or glued or connected in another way which appears suitable to those skilled in the art.

In one advantageous embodiment, the at least one positioning means has at least one recess for accommodating an object. A positioning unit which is usable in a particularly versatile manner may thus be provided. The case interior may be used particularly advantageously. An "object for storage" in the positioning means is to be understood in this context in particular as an element usable in conjunction with a handheld power tool, for example, a holding element, such as a belt hanging tab, or insert tools, measuring means, instructions, and/or documentation means.

Furthermore, it is provided that the at least one positioning means is designed as a bar. A positioning unit having a simple design may thus be provided. A handheld tool case for a particularly efficient wireless energy transmission may be provided having a simple design. A particularly cost-effective handheld tool case may be provided. A positioning means having a simple design may be provided, which is intended to convert the closing force into a positioning force on at least two transportation objects. A "bar" is to be understood in this context in particular as an oblong, at least essentially prism-shaped element. The bar preferably has a length, a height, and a width and the length is at least three times, preferably at least four times, and preferably at least five times the width and/or height. The width and the height preferably deviate from one another by less than a factor of three. The positioning means preferably has at least two active surfaces, which are each intended to interact with corresponding active surfaces of at least two transportation objects.

In one advantageous embodiment, the positioning unit has at least one positioning means which is attached to the base unit in an installed state. A positioning unit may thus be provided which advantageously converts gravity into the positioning force. The positioning unit attached to the base unit is preferably designed as a case insert and, in an installed state, rests against a bottom wall opposite to the cover unit in a closed state. The positioning unit is preferably connected to the bottom wall. However, it is also possible that the positioning unit is connected to the side wall and/or to a further side wall of the base unit. The positioning unit is preferably connected in an integrally-joined, form-locked, or friction-locked manner to the base unit.

Furthermore, it is provided that the positioning unit has at least one indication means, which is intended to indicate a predetermined storage position of the at least one transportation object to a user. A user may thus recognize the predetermined storage position particularly simply. A high level of operating convenience during the insertion of the at least one transportation object into the handheld tool case may be achieved. An unfavorable and/or unsuitable arrangement of the at least one transportation object in the case interior may advantageously be avoided. Particularly reliable storage and/or transportation may be achieved. The indication means preferably has a surface shape of a receptacle for the at least one transportation object. The surface shape of the receptacle preferably corresponds to at least one area of a shape of the at least one transportation object. The receptacle is preferably intended for storing the at least one transportation object in at least two different orientations, which preferably transition into one another by way of a rotation by 180°. It is also possible that the indication means is designed as an inscription, an image, a symbol, or another informative sign which appears suitable to those skilled in the art. A predetermined "storage position" is to be understood in this context as a position of the at least one transportation object in the case interior, which is optimized with respect to a spatial utilization and/or with respect to an energy transmission procedure and/or with respect to a further variable. For a transportation object which is intended for receiving energy wirelessly, the predetermined storage position preferably corresponds to the predetermined charging position.

The handheld tool case advantageously includes an at least partially adjustable case insert, which is intended for storage of a handheld power tool. A handheld tool case adjustable to various types of transportation objects may thus be provided. A handheld tool case adjustable to various types of handheld power tools may be provided. A particularly flexibly usable handheld tool case may be provided. "Adjustable" is to be understood in this context in particular as fixable in various positions in the case interior, preferably fixable in various positions in relation to the side wall. The positions preferably transition into one another by displacement perpendicularly to the side wall and/or in parallel to a bottom wall of the base unit. The case insert is preferably adjustable to a plurality of discrete positions in the case interior. It is also possible that the handheld tool case has a guide unit, in particular a linear guide unit, which is intended for a continuous adjustment of the position of the case insert. The case insert is preferably connectable to the base unit in a form-locked manner way in at least one direction in parallel to the bottom wall. It is also possible that the case insert is connectable to the base unit with the aid of a latch connection or a hook-and-loop connection or another connection which appears suitable to those skilled in the art. Various "types" of transportation objects are to be understood in this context in particular as various types of rechargeable battery devices and/or handheld power tools. Various types preferably have a different dimension in at least one direction. The various types preferably have a different intended use and/or at least one different power parameter, for example, a capacitance, an output power, and/or a charging speed.

Furthermore, a positioning unit of a handheld tool case according to the present invention is provided. A positioning unit may thus be provided for particularly precise positioning of the at least one transportation object. A high efficiency may be achieved for wireless energy transmission to the transportation object. A "positioning unit" is to be understood in this context in particular as a unit which is intended to move the at least one transportation object into a preferably predetermined storage position and/or hold it in the storage position as a function of an initial position of the transportation object.

Furthermore, an example system having a handheld tool case according to the present invention is provided, including at least one transportation object which is intended for storage and/or transportation in the handheld tool case. A system for particularly reliable storage of the transportation object may thus be provided. The system is preferably designed so it may be coupled to a holding device for the handheld tool case, which is intended to provide energy for wireless energy transmission in the handheld tool case.

The at least one transportation object is advantageously designed as a rechargeable battery device for an energy supply of a handheld power tool. A particularly efficient charging process may thus be achieved during storage of the rechargeable battery device in the handheld tool case. The rechargeable battery device is preferably intended for a charging process with the aid of wireless electrical energy transmission. Particularly low energy consumption for charging the rechargeable battery device may be achieved.

In one advantageous embodiment, the system includes a handheld power tool, which is intended to be transported and/or stored while it is at least mechanically coupled to the rechargeable battery device in the handheld tool case. Convenient handling of the handheld power tool may thus be achieved. A system which is usable in a particularly versatile way may be provided. The rechargeable battery device may be charged during storage in the handheld tool case, whereby a high level of availability of the system may be achieved.

Furthermore, a method using a system according to the present invention, in which the closing force is converted into the positioning force during the closing movement. At least one transportation object may thus be positioned for storage, transportation, and/or a charging process in a way which is particularly convenient for a user. The transportation object may be moved into a predetermined charging position for an optimized charging process in a simple and checkable way.

The system according to the present invention and the handheld tool case according to the present invention are not to be restricted in this case to the above-described application and specific embodiment. In particular, the handheld tool case according to the present invention may have a number of individual elements, components, and units which deviates from a number mentioned herein to fulfill a functionality described herein.

BRIEF DESCRIPTION OF THE DRAWINGS

Further advantages result from the following description of the figures. One exemplary embodiment of the present invention is shown in the figures. The figures and the description herein contain numerous features in combination. Those skilled in the art will advantageously also consider the features individually and combine them to form meaningful further combinations.

DETAILED DESCRIPTION OF EXAMPLE EMBODIMENTS

Figure 1:
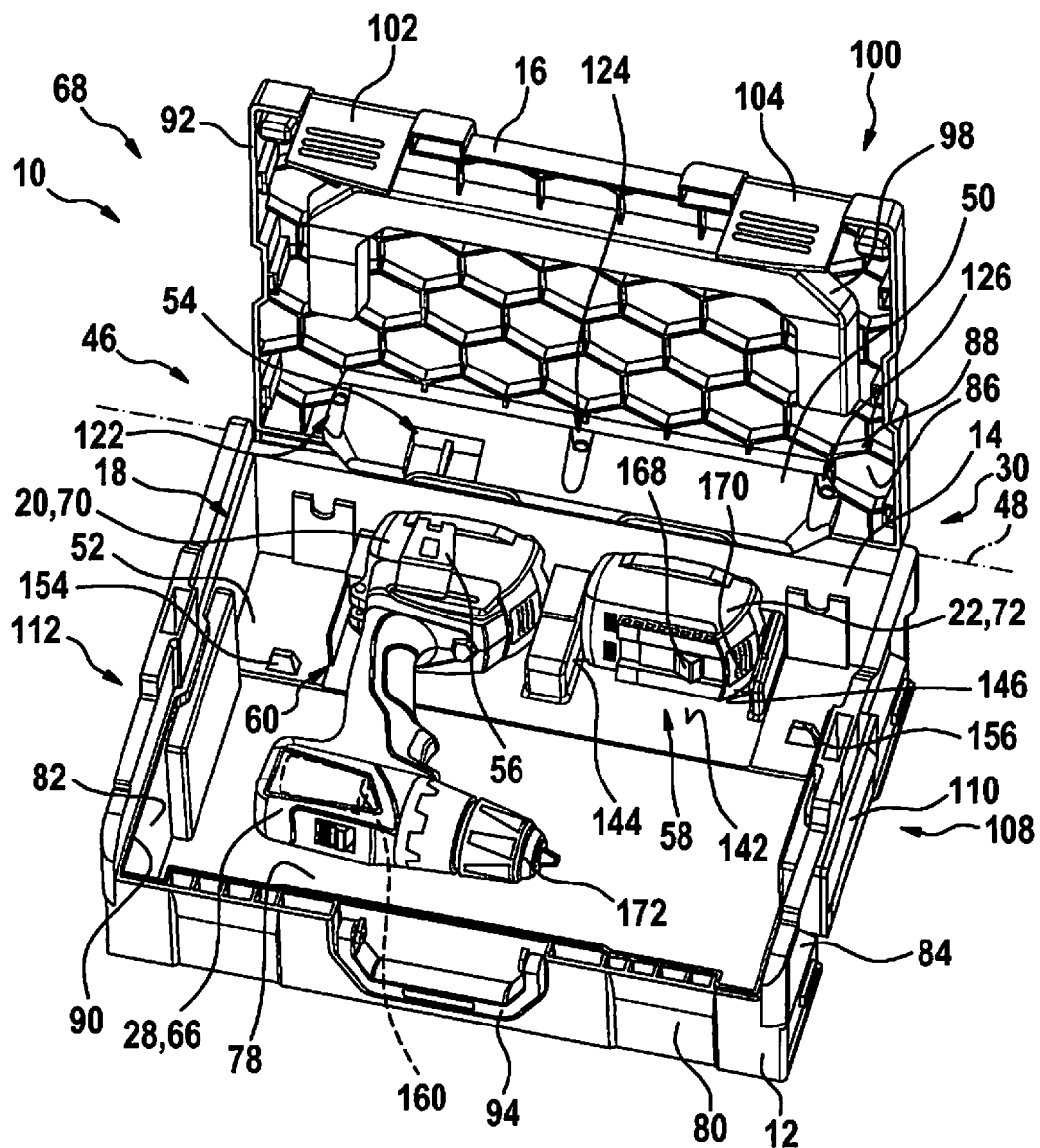
FIG. 1 shows a system according to the present invention including a handheld tool case and a plurality of transportation objects in a perspective view.

FIG. 1 shows a system 68 including a handheld tool case 10 and a plurality of transportation objects 20, 22, 24, 26, 28, which are intended for storage and/or transportation in handheld tool case 10. Handheld tool case 10 includes a base unit 12, which is designed as a bottom unit. Base unit 12 is designed in the form of an open cuboid and has a bottom wall 78 and four side walls 14, 80, 82, 84, which are situated essentially perpendicularly to bottom wall 78. Handheld tool case 10 furthermore includes a cover unit 16, which is intended to directly delimit, with base unit 12, a case interior 18 for storage and/or transportation of transportation objects 20, 22, 24, 26, 28. In the present exemplary embodiment, cover unit 16 is essentially flat. Cover unit 16 includes a cover wall 86 and a hexagonal honeycomb grid 88, which is intended to reinforce cover unit 16. In a closed state, honeycomb grid 88 faces toward case interior 18. Base unit 12 has a closing edge 90 on four side walls 14, 80, 82, 84 and cover unit 16 has a closing edge 92. Closing edge 90 of base unit 12 and closing edge 92 of cover unit 16 are in contact with one another in a closed state of handheld tool case 10 and seal case interior 18 in a dust-tight and/or moisture-tight manner. Base unit 12 and cover unit 16 are made in the present exemplary embodiment of an identical break-proof material. Base unit 12 and cover unit 16 are made of a plastic. Handheld tool case 10 has a width, a depth, and a height.

Handheld tool case 10 includes two handles 94, 96. A first of handles 94 is designed as a bow and is situated on one of side walls 80 of base unit 12. Handle 94 has two brackets. Handle 94 is swivelably supported with the aid of the brackets on side wall 80. Handle 94 has a rest position, in which a handle plane is situated in parallel to side wall 80. Handle 94 has a carrying position, in which the handle plane is situated at least essentially perpendicular to side wall 80. Handle 94 has a longitudinal extension in the present exemplary embodiment which corresponds to approximately one-third of the width of handheld tool case 10. A second of handles 96 is situated on an outer surface of cover unit 16 facing away from base unit 12. Cover unit 16 has a trough-shaped receptacle 98, which is intended to accommodate handle 94 in a rest position. Handle 96 is designed as a bow and has two brackets. Handle 96 is swivelably supported with the aid of the brackets on cover unit 16. Handle 96 has a rest position, in which a handle plane is situated in parallel to cover unit 16. Handle 96 has a carrying position, in which the handle plane is situated at least essentially perpendicular to cover unit 16. Handle 96 has a longitudinal extension in the present exemplary embodiment which corresponds to approximately four-fifths of the width of handheld tool case 10.

Handheld tool case 10 has a closing unit 100, which is intended to hold cover unit 16 in a closed state. Closing unit 100 is intended to connect cover unit 16 and base unit 12 in a closed state. In the present exemplary embodiment, closing unit 100 includes two movable closing elements 102, 104, which are designed as bracket-shaped flaps. Closing elements 102, 104 are swivelably supported on cover unit 16. Closing elements 102, 104 each have a latch point 106 on a side opposite to the bearing side. Latch points 106 are each intended to cooperate with corresponding catch means on base unit 12. Closing elements 102, 104 form a form-locked connection with base unit 12 in a latched state. Handheld tool case 10 is intended to be used in a charging holding device (not shown in greater detail), which is intended to provide energy for the wireless energy transmission. Handheld tool case 10 includes a holding unit 108, which is intended to hold handheld tool case 10 in the charging holding device. Holding unit 108 includes two holding elements 110, 112, which are designed as spring-loaded latching elements. In a state in which handheld tool case 10 is inserted into the charging holding device, holding elements 110, 112 cooperate with corresponding holding elements of the charging holding device. Holding elements 110, 112 are situated on two opposing side walls 82, 84.

Handheld tool case 10 includes a positioning unit 30, which, in at least one operating state, during a closing movement between base unit 12 and cover unit 16, converts a closing force into a positioning force on at least one of transportation objects 20, 22, 24, 26, 28. The positioning force has an essential component in the direction of one of side walls 14. One of side walls 14 is formed as a rear wall and is opposite to side wall 80, on which first handle 96 is situated. Side wall 14 formed as the rear wall encloses an angle of approximately 92° with bottom wall 78. Side wall 80, on which first handle 94 is situated, encloses an angle of approximately 92° with bottom wall 78. In the present exemplary embodiment, the positioning force has an essential component in the direction of side wall 80 formed as the rear wall.

A part of transportation objects 20, 22, 24, 26 each has a charging unit 114. Charging unit 114 is intended to receive energy in a charging process with the aid of wireless energy transmission. Charging unit 114 includes a secondary coil, which is intended to convert magnetic field energy into electrical energy. Handheld tool case 10 has two predetermined charging positions of transportation objects 20, 22, 24, 26, which have a charging unit 114. Transportation objects 20, 22, 24, 26 are intended to receive energy in the predetermined charging position during a charging process. In the predetermined charging position, the secondary coils of charging units 114 are oriented flush with primary coils, which are situated outside handheld tool case 10 during a charging process. The positioning force has an essential component in the direction of the predetermined charging positions. Positioning unit 30 is intended, in at least one operating state, during a closing movement between base unit 12 and cover unit 16, to move transportation objects 20, 22, 24, 26 into the predetermined charging positions. In an operating state in which at least one of transportation objects 20, 22, 24, 26 cannot be situated in the associated charging position due to a foreign body, positioning unit 30 generates a resistance against the closing movement and indicates an interference by the foreign body to a user. The foreign body may be work equipment, for example, an insert tool or a fastener, or a piece of a working material made of stone, wood, or plastic.

Figure 6:
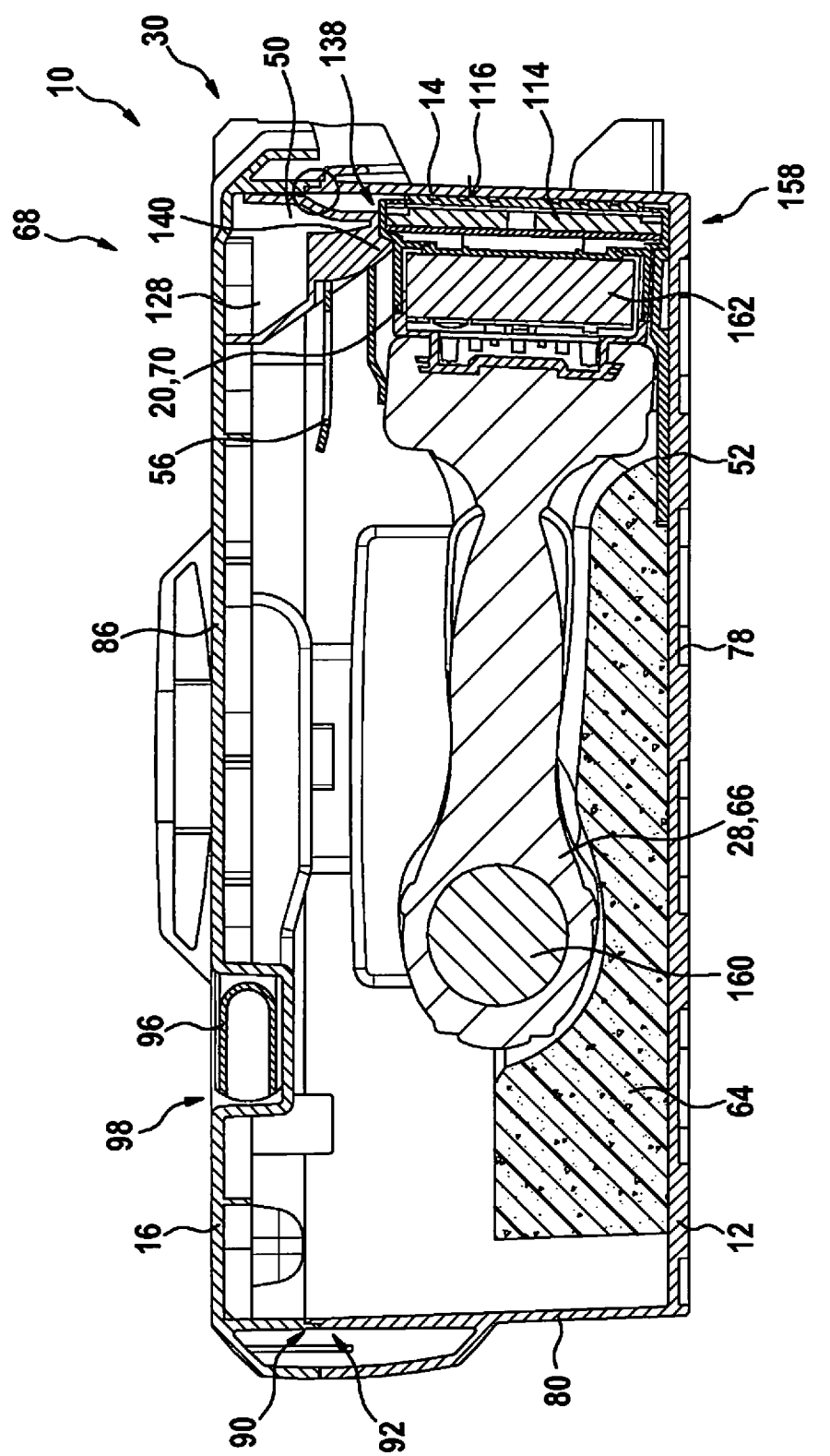
FIG. 6 shows the system in a section perpendicular to the length of the handheld tool case including a handheld power tool and a rechargeable battery device.
Figure 7:
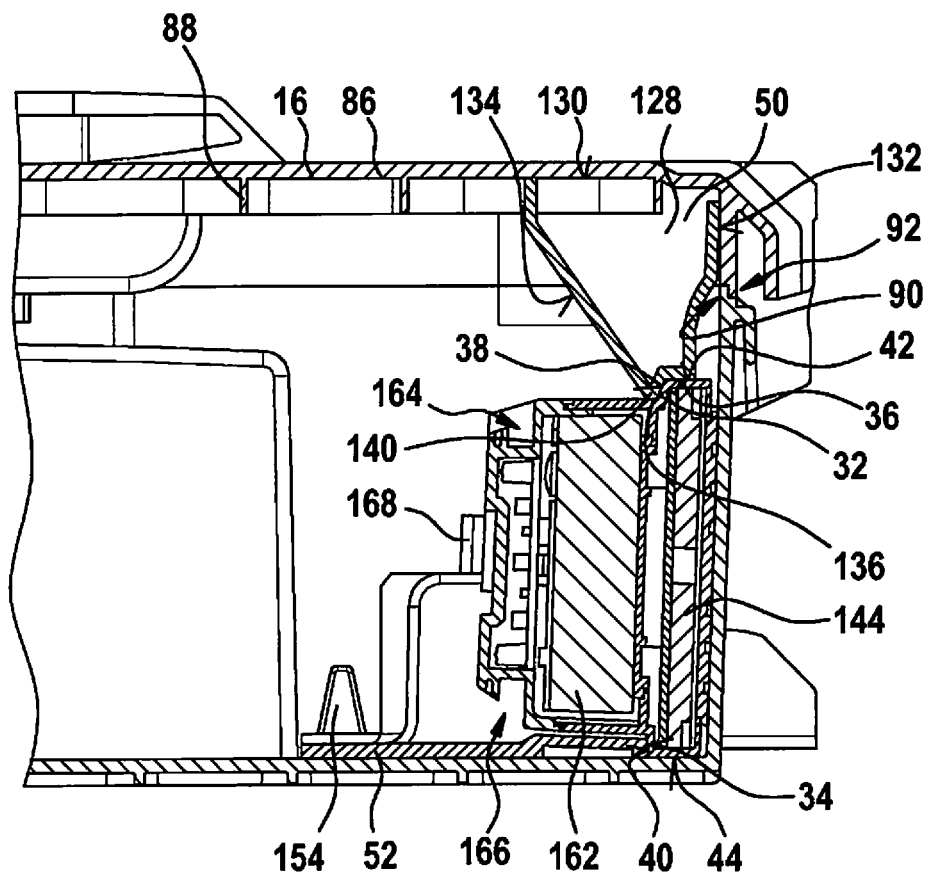
FIG. 7 shows a detail view perpendicular to the length of the handheld tool case.

Positioning unit 30 is intended to move transportation objects 20, 22, 24, 26, 28 toward side wall 14 and align them in relation to side wall 14. The charging positions are situated directly adjoining side wall 14. Side wall 14 is designed as transmissive for a wireless energy transmission. Transportation objects 20, 22, 24, 26, which include a charging unit 114, each have a flatly formed charging side 116 (cf. FIGS. 6 and 7). In the charging position, charging side 116 is in contact with side wall 14 in each case. Side wall 14 has an inner surface, which delimits case interior 18. The inner surface is essentially flat. The inner surface is flat in an area of each of the charging positions of transportation objects 20, 22, 24, 26. The inner surface is smooth in an area of each of the charging positions of transportation objects 20, 22, 24, 26. In the charging positions, transportation objects 20, 22, 24, 26 rest with charging side 116 against side wall 14. In the charging position, charging sides 116 and side wall 14 are each aligned in parallel to one another. Positioning unit 30 is intended to displace, in at least one operating state, transportation objects 20, 22, 24, 26 along a further one of side walls 82, 84. Positioning unit 30 is intended to fix transportation objects 20, 22, 24, 26. Positioning unit 30 is intended to fix transportation objects 20, 22, 24, 26 in relation to side wall 14. Positioning unit 30 is intended to fix transportation objects 20, 22, 24, 26 in relation to bottom wall 78.

Positioning unit 30 converts, in at least one operating state, during a closing movement between base unit 12 and cover unit 16, a closing force into a clamping force on transportation objects 20, 22, 24, 26, 28. The clamping force has at least one essential component in the direction of side wall 14. The clamping force presses transportation objects 20, 22, 24, 26, 28 against side wall 14 in a closed state of cover unit 16. The clamping force generates a pressure between each of charging sides 116 of transportation objects 20, 22, 24, 26 and side wall 14.

In the present exemplary embodiment, positioning unit 30 includes a plurality of active surfaces 32, 34, 36, which are each intended to cooperate with a corresponding active surface 38, 40, 42 of at least one transportation object 20, 22, 24, 26. Active surfaces 32, 34, 36 are each intended, at least in a closed state of cover unit 16, to be in contact with respective corresponding active surface 38, 40, 42 of transportation object 20, 22, 24, 26. Three of the active surfaces 32, 34, 36 are intended to cooperate with an identical transportation object 20, 22, 24, 26. Active surfaces 32, 34, 36, which are intended to cooperate with an identical transportation object 20, 22, 24, 26, are combined to form a group for the further description. Positioning unit 30 has two such similarly formed groups in the present exemplary embodiment. A first of the groups will be described in greater detail hereafter. A first of active surfaces 32 of the group and a second of active surfaces 34 of the group each have a surface normal having a component in the direction of side wall 14. A ratio of the components of the surface normals in the direction of side wall 14 in relation to the components in parallel to side wall 14 is approximately 4:1. The surface normals of active surfaces 32, 34 enclose an angle of approximately 165° with the surface normals of side wall 14. First active surface 32 and second active surface 34 are each formed as an inclined surface. A third active surfaces 36 of the group has a surface normal which, in a closed state of the cover unit, is situated essentially in parallel to side wall 14.

Handheld tool case 10 includes a bearing unit 46, which has a swivel axis 48, about which cover unit 16 and base unit 12 are swivelably supported in relation to one another for the closing movement. Bearing unit 46 connects, in an installed state, base unit 12 to cover unit 16 on a longitudinal side of base unit 12 and on a longitudinal side of cover unit 16. Bearing unit 46 is situated on side wall 14 formed as a rear wall. Bearing unit 46 is situated opposite to bottom wall 78. Swivel axis 48 of bearing unit 46 is situated in parallel to cover unit 16, to side wall 14 formed as a rear wall, and to bottom wall 78. Active surfaces 32, 34, 36 are situated in parallel to the swivel axis. Bearing unit 46 includes, in the present exemplary embodiment, bearing elements 118, 120 formed corresponding to one another at two bearing points situated spaced apart in the longitudinal direction of handheld tool case 10. A first part of bearing elements 118 is situated on base unit 12, a further part of bearing elements 120 is situated on cover unit 16. The rear wall of base unit 12 has an outer side, on which the first part of bearing elements 118 is situated. The positioning force has an essential component oriented in the radial direction in relation to swivel axis 48. The component is oriented in the direction toward swivel axis 48. The positioning force has an essential component oriented in the circumferential direction in relation to swivel axis 48.

Positioning unit 30 has a positioning means 50, which is attached to cover unit 16 in an installed state. In each case first active surface 32 in a group of active surfaces 32, 34, 36, which are intended to cooperate with an identical transportation object 20, 22, 24, 26, is situated on positioning means 52. In each case third active surface 36 in the group is situated on positioning means 50. Active surfaces 32, 36 situated on positioning means 50 are situated adjacent to one another and have a shared edge. Positioning means 50 is fixedly connected to cover unit 16 in the present exemplary embodiment. Positioning means 50 is formed separately from cover unit 16 and is screwed onto cover unit 16 in an installed state. Positioning means 50 has a plurality of boreholes, through which screws are guided in an installed state. Positioning means 50 has a plurality of screw bushings 122, 124, 126, which each open an access to the boreholes for screws in a screw direction. In the present exemplary embodiment, positioning means 50 has three boreholes for accommodating screws. One of screw bushings 124 is situated centrally in relation to a main extension of positioning unit 30. Two further screw bushings 122, 126 are situated at opposing ends of positioning means 50. Positioning means 50 has slotted recesses, which correspond to honeycomb grid 88 of cover unit 16. In an installed state, positioning means 50 is in contact with cover wall 86. Positioning means 50 is situated with respect to action, in a closed state of cover unit 16, between cover unit 16 and transportation objects 20, 22, 24, 26, which are situated in the charging positions. Positioning means 50 includes a recess 54 for accommodating an object 56. Recess 54 is intended in the present exemplary embodiment for a holding element. The holding element is situated on one of transportation objects 28 and is intended to fasten transportation object 28 on a trousers belt or on a tool belt. Object 56 is designed in the present exemplary embodiment as a curved metal tab. Recess 54 has a prism shape and has a web, which is intended to engage in a recess of object 56.

Positioning means 50 connected to cover unit 16 is designed in the form of a bar. In the present exemplary embodiment, positioning means 50 is made of plastic. It is possible that positioning means 50 is made of another material which appears suitable to those skilled in the art, for example, metal. Positioning means 50 is situated in parallel to swivel axis 48 in an installed state. Positioning means 50 has a length which extends along cover unit 16 and in the direction of swivel axis 48. Positioning means 50 has a width which extends along cover unit 16 and essentially perpendicular to swivel axis 48. Positioning means 50 has a height which extends perpendicularly to cover unit 16 and essentially perpendicularly to swivel axis 48. The width of positioning means 50 is approximately one-sixth of the length of positioning means 50. The height and the width of positioning means 50 approximately correspond to one another. Positioning means 50 has an essentially trapezoidal cross section 128. It is possible that positioning means 50 has an essentially triangular cross section. A first side 130 of cross section 128 extends in the direction of the width and is situated in parallel to cover unit 16 and facing toward cover unit 16 in an installed state. A further side 132 of cross section 128 extends essentially in the direction of the height and is situated essentially perpendicularly to cover unit 16. Further side 132 faces toward swivel axis 48 and/or side wall 14, which is formed as a rear wall, of base unit 12 in a closed state. A third side 134 of cross section 128 is situated inclined in relation to cover unit 16. Third side 134 of cross section 128 is situated facing away from swivel axis 48. Positioning means 50 tapers with increasing distance from cover unit 16. A fourth side 136 of cross section 128 is the shortest of the four sides 130, 132, 134, 136 and is situated opposite to cover unit 16 in an installed state. Fourth side 136 is situated essentially parallel to cover unit 16.

Fourth side 136 of cross section 128 corresponds to a side of positioning means 50 which is situated facing away from cover unit 16. Positioning means 50 is intended in the present exemplary embodiment for simultaneously positioning two transportation objects 20, 22, 24, 26. Positioning means 50 has two recesses 138 on fourth side 136, which are each intended to accommodate one transportation object 20, 22, 24, 26. Recesses 138 are formed symmetrically in relation to a plane perpendicular to a main extension direction. Recesses 138 are formed similarly to one another, because of which only a first of recesses 138 is described in greater detail hereafter. Recess 138 extends in the longitudinal direction of positioning means 50 and has a length of approximately one-fifth of the length of positioning means 50. A part of active surfaces 32, 36 of positioning means 50 are situated in the area of recesses 138. In each case first active surface 32 and third active surface 36 of a group of active surfaces 32, 34, 36, which are intended to cooperate with a similar transportation object, are situated in the area of recess 138. Active surfaces 32, 36 are each formed as an oblong rectangle. A main extension of each of active surfaces 32, 36 extends in the longitudinal direction of positioning means 50. Positioning means 50 forms an essentially triangular lug 140 in cross section 128 due to recess 138 on side 136, which faces away from cover unit 16. Lug 140 has a side which, in a closed state of cover unit 16, faces toward side wall 14 of base unit 12 formed as a rear wall. First active surface 32 is situated on the side of lug 140. Third active surface 36 is situated essentially in parallel to cover unit 16.

Positioning unit 30 has a further positioning means 52, which is attached to base unit 12 in an installed state. In the present exemplary embodiment, further positioning means 52 has an insert element and is inserted in base unit 12 in an installed state. It is possible that further positioning means 52 is fixedly connected to base unit 12 and/or is integrally formed with base unit 12. It is possible that further positioning means 52 is connected to base unit 12 with the aid of a form-locked connection, a latching connection, and/or a hook-and-loop connection. It is also possible that positioning means 52 has a plurality of insert elements. In the present exemplary embodiment, the insert element is made of plastic. The insert element is molded from a plastic slab. It is also possible that the insert element is formed solid. Further positioning means 52 is intended in the present exemplary embodiment for simultaneously positioning two transportation objects 20, 22, 24, 26. Further positioning means 52 has two receptacles, which are each intended for one of transportation objects 20, 22, 24, 26. The receptacles have a plane of symmetry which is situated perpendicularly to bottom wall 78 and perpendicularly to side wall 14. The receptacles are each intended to store transportation objects 20, 22, 24, 26 in two orientations opposite to one another. A part of active surfaces 34 of positioning unit 30 is situated on further positioning means 52. Active surfaces 34 are situated on the receptacles of positioning means 52 for transportation objects 20, 22, 24, 26.

Active surfaces 34 situated on further positioning means 52 are each second active surfaces 34 in the groups of active surfaces 32, 34, 36, which are intended to cooperate with similar transportation object 20, 22, 24, 26.

Positioning unit 30 has an indication means 58, 60, 62, which is intended to indicate a storage position of the at least one transportation object 20, 22, 24, 26, 28 to a user. The storage position corresponds to the predetermined charging position for transportation objects 20, 22, 24, 26 having a charging unit 114. In the present exemplary embodiment, indication means 58, 60, 62 has two reliefs, which form the receptacles for transportation objects 20, 22, 24, 26. The reliefs each correspond to a negative of a relief of transportation object 20, 22, 24, 26 intended for the particular receptacle. The receptacles each have a bottom wall 142 and two side walls 144, 146, which are each in contact with transportation object 20, 22, 24, 26 in the storage position. Positioning unit 30 partially encloses transportation objects 20, 22, 24, 26 in an inserted state. During an insertion procedure, the user recognizes, by way of a comparison of the reliefs, the storage position of transportation objects 20, 22, 24, 26. If transportation objects 20, 22, 24, 26 are positioned unsuitably, surfaces intended for contact only partially come into contact with one another and it is thus indicated to the user that transportation objects 20, 22, 24, 26 are not situated in the storage position.

Figure 2:
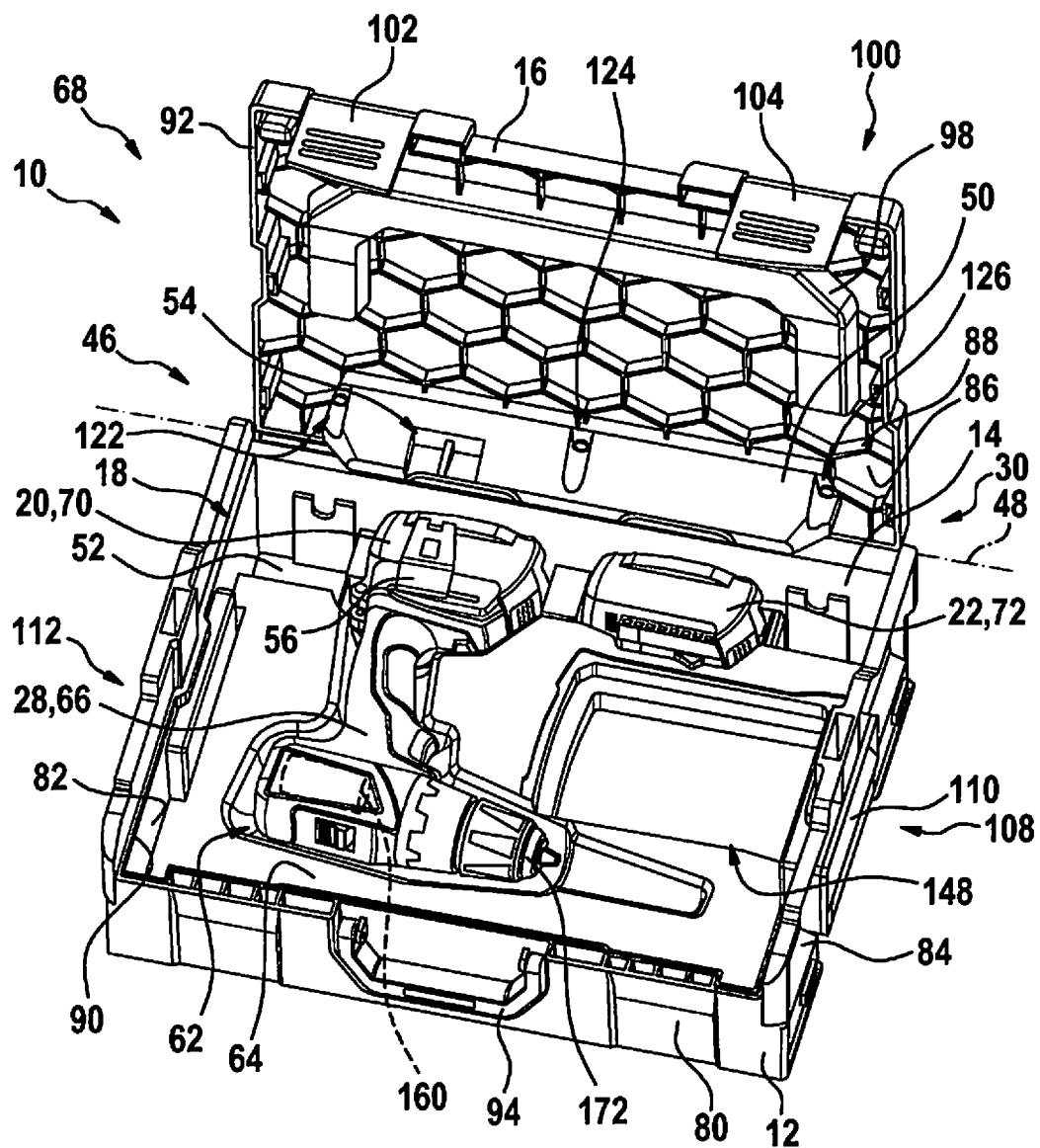
FIG. 2 shows the system including a case insert.

Handheld tool case 10 has an at least partially adjustable case insert 64, which is intended for storing a handheld power tool 66. Case insert 64 is in contact with bottom wall 78 of handheld tool case 10 in an installed state. Case insert 64 rests on bottom wall 78 of handheld tool case 10 in an installed state. Case insert 64 has a receptacle for handheld power tool 66 (cf. FIG. 2). It is possible that the receptacle is intended for different types of handheld power tools. A relief of the receptacle corresponds to a negative of a relief of handheld power tool 66. The relief forms an indication means 62 of handheld tool case 10, which is intended to indicate a storage position of handheld power tool 66 to a user. Case insert 64 has an upper delimitation surface. The relief of the receptacle is introduced as a depression into the upper delimitation surface.

The relief has a distance to handheld power tool 66 in the storage position at a transition of the relief to the delimitation surface. Alternatively, it is possible that the relief presses against handheld power tool 66 in the area of the transition. Case insert 64 has a further receptacle 148, which is intended for accessory parts, for example, to accommodate a wired charging device, insert tools, and/or for work material. Further receptacle 148 has a step which extends around a bottom circumference. It is possible that case insert 64 has further receptacles which appear suitable to those skilled in the art.

Case insert 64 is formed in the present exemplary embodiment as a solid body, for example, made of a foamed plastic or another material which appears suitable to those skilled in the art. It is also possible that case insert 64 is made of an at least essentially hollow plastic form, which is manufactured from a plastic slab in a thermoforming method, for example.

Figure 4:
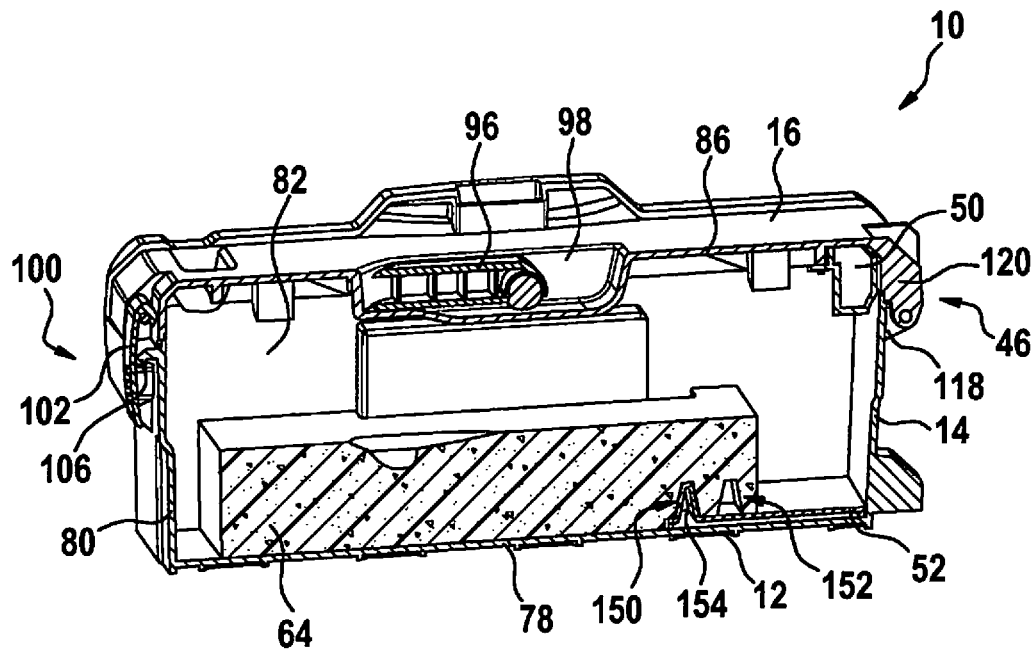
FIG. 4 shows the handheld tool case in a closed state of a cover unit in a perspective section perpendicular to a length of the handheld tool case.
Figure 5:
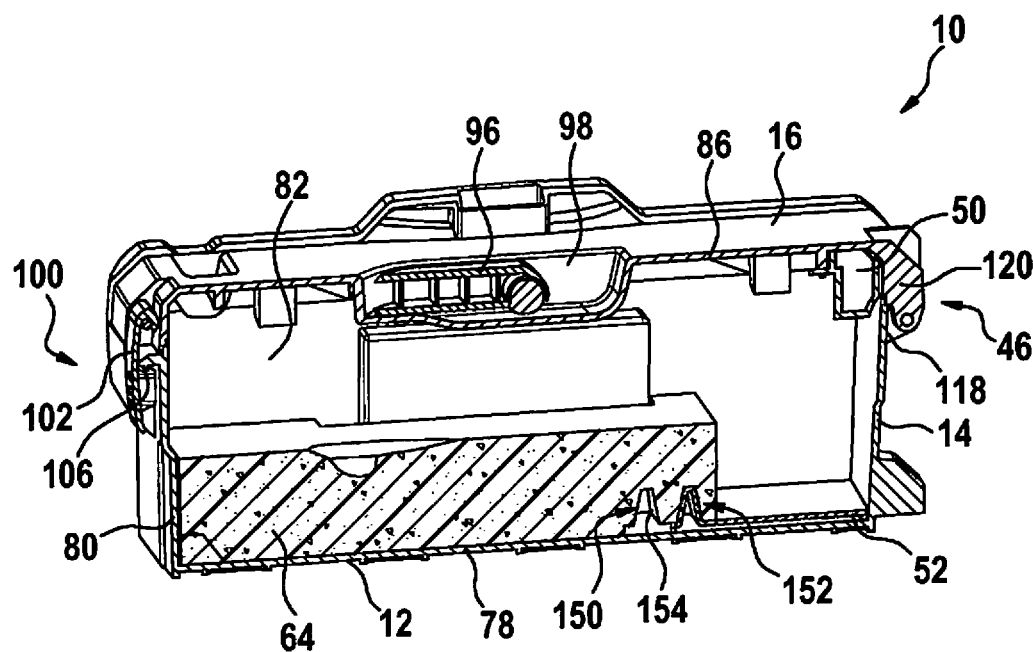
FIG. 5 shows the handheld tool case including the case insert in the second insertion position.

Case insert 64 is intended in the present exemplary embodiment for two insertion positions in relation to base unit 12. The insertion positions differ by way of a distance of the case insert from the side wall of the handheld tool case formed as a rear wall (cf. FIGS. 4 and 5). Handheld tool case 10 has an adjustment unit, which is intended to fix case insert 64 in the different insertion positions. The adjustment unit includes four form-locking elements 150, 152, which are situated on case insert 64. Two of form-locking elements 150, 152 are shown in FIGS. 4 and 5. Form-locking elements 150, 152 are situated on a side of case insert 64 which faces toward bottom wall 78 of base unit 12 in an installed state. Form-locking elements 150, 152 are formed as slotted recesses in the present exemplary embodiment. The recesses have a triangular cross section. Form-locking elements 150, 152 are each situated on an edge of case insert 64 in relation to the length of handheld tool case 10. The adjustment unit has two further form-locking elements 154, 156 in the present exemplary embodiment, which are formed as complementary to form-locking elements 150, 152 of case insert 64. The two further form-locking elements 154, 156 are situated on further positioning means 52 and are formed as pegs. Form-locking elements 154, 156 are integrally formed with further positioning means 52. Further form-locking elements 154, 156 are oriented perpendicularly to bottom wall 78 in an installed state. A first pair of form-locking elements 150 of case insert 64 is engaged in a first insertion position of case insert 64 with form-locking elements 154, 156 situated on further positioning means 52. A further pair of form-locking elements 152 of case insert 64 is engaged in a further insertion position of case insert 64 with form-locking elements 154, 156 situated on further positioning means 52. It is possible that the adjustment unit has further form-locking elements, which are intended to be engaged with one another in further insertion positions of case insert 64. Alternatively, it is also possible that the adjustment unit includes a linear guide and/or an inhibited linear drive.

In the present exemplary embodiment, system 68 includes five transportation objects 20, 22, 24, 26, 28. It is possible that system 68 includes a larger number or a smaller number of transportation objects 20, 22, 24, 26, 28. Four of transportation objects 20, 22, 24, 26 are each designed as a rechargeable battery device 70, 72, 74, 76. Features which transportation objects 20, 22, 24, 26 designed as a rechargeable battery device 70, 72, 74, 76 have in a similar way are described hereafter as representative of a first of transportation objects 20.

Transportation object 20 has a length, a width, and a height. In a state inserted into handheld tool case 10, the width is aligned at least essentially perpendicularly to bottom wall 78 of handheld tool case 10. In the inserted state, the height is situated at least essentially perpendicularly to side wall 14, which is formed as the rear wall. The length is situated in parallel to side wall 14 and to bottom wall 78. In the present exemplary embodiment, transportation object 20 has a first plane of symmetry, which extends along the height and along the length of transportation object 20. Transportation object 20 includes a base body, which has a widening 158. Widening 158 has two wing-like bulges. One of the bulges is arranged in the present exemplary embodiment on either side which extends along the length and the height. It is also possible that the bulges are each situated on another side of transportation object 20. The bulges each have a trapezoidal cross section in a plane perpendicular to the length. Positioning means 50, 52 each have an area associated with transportation object 20, which has a relief corresponding to a negative of the bulges. In the present exemplary embodiment, widening 158 is situated in a base area of transportation object 20. Widening 158 is situated adjacent to charging side 116 of transportation object 20. Transportation object 20 has a second plane of symmetry in the area of the widening, which extends along the height and along the width. It is also possible that widening 158 is situated at another height, for example, at a middle height of transportation object 20. Widening 158 protrudes on two opposing sides beyond an area adjacent to widening 158.

Widening 158 has four active surfaces 38, 40, 42, 44. Two of active surfaces 38, 40 are formed as inclined surfaces and each enclose an angle of approximately 15° with charging side 116. Active surfaces 38, 40 formed as inclined surfaces are intended to cooperate with active surfaces 32, 34 of positioning unit 30, which are formed as inclined surfaces. A first of active surfaces 38 is intended to cooperate with positioning means 50 attached to cover unit 16. A second of active surfaces 40 is intended to cooperate with positioning means 52 attached to base unit 12. First active surface 38 and second active surface 40 are formed symmetrically with respect to the planes of symmetry of transportation object 20. Active surfaces 38, 40 of transportation object 20, which are formed as inclined surfaces, and active surfaces 32, 34 of positioning unit 30, which are formed as inclined surfaces, are intended to slide past one another. Active surfaces 38, 40 of transportation object 20, which are formed as inclined surfaces, and active surfaces 32, 34 of positioning unit 30, which are formed as inclined surfaces, are in contact with one another in the present exemplary embodiment in an inserted state of transportation object 20. Active surfaces 38, 40 of transportation object 20, which are formed as inclined surfaces, and active surfaces 32, 34 of positioning unit 30, which are formed as inclined surfaces, form a wedge drive in an installed state, which converts an approach of the inclined surfaces of positioning unit 30 into a force on transportation object 20 in the direction of side wall 14. A third of active surfaces 42 and a fourth of active surfaces 44 are each situated essentially perpendicularly to charging side 116. The third of active surfaces 42 is intended to cooperate with positioning means 52 attached to cover unit 16. The fourth of active surfaces 44 is intended to cooperate with bottom wall 78 of base unit 12.

Transportation object 20, which is designed as a rechargeable battery device 70, is intended to store energy for the energy supply of a drive unit 160 of a handheld power tool 66. It is possible that rechargeable battery device 70 is intended to supply further units with electrical energy, for example, a display and/or a control and/or regulating unit. Rechargeable battery device 70 is intended for a charging process with the aid of wireless energy transmission. Rechargeable battery device 70 is essentially cuboidal in the present exemplary embodiment. Rechargeable battery device 70 includes an energy storage unit 162, which is intended to store electrical energy and to supply drive unit 160 of handheld power tool 66 with electrical energy. Rechargeable battery device 70 furthermore includes a housing, which is intended to store and protect components of rechargeable battery device 70. The housing is intended to store and protect energy storage unit 162. The housing is made of a solid plastic in the present exemplary embodiment.

Rechargeable battery device 70 includes a mechanical interface unit and an electrical interface unit for a detachable electrical and mechanical connection to handheld power tool 66. The interface unit is situated on an interface side of rechargeable battery device 70 opposite to the housing base side. Rechargeable battery device 70 has a plug-in direction. The plug-in direction is aligned in parallel to charging side 116 in the present exemplary embodiment. The housing is formed stepped on the interface side. In the present exemplary embodiment, the housing has two guide elements 164, 166 at a step transition, which are each formed as a groove in the plug-in direction.

The mechanical interface unit includes a spring-loaded latching element 168, which is intended to latch rechargeable battery device 70 with handheld power tool 66. Latching element 168 is swivelably supported on the interface side and protrudes beyond the interface side in a latch position. Latching element 168 is intended for a form-locked connection to a corresponding element (not shown in greater detail) of handheld power tool 66. The interface unit has an unlocking element 170. Unlocking element 170 is connected to latching element 168 and is intended to swivel latching element 168 against a spring force and lower it into the interface side for unlocking. Rechargeable battery device 70 is intended to be detached without tools and in a nondestructive way from handheld power tool 66 proceeding from a connected state.

System 68 includes a handheld power tool 66, which is intended to be transported and/or stored in handheld tool case 10 while at least mechanically coupled to rechargeable battery device 70. The fifth of transportation objects 28 is designed as handheld power tool 66. Handheld power tool 66 is designed in the present exemplary embodiment as a cordless screwdriver. Handheld power tool 66 includes a base body and a handle. Handheld power tool 66 has an electrical drive unit 160, which is designed as an electric motor, and a tool receptacle 172, which is intended to accommodate an insert tool (not shown in greater detail), for example, a screwdriver blade. Handheld power tool 66 furthermore includes a gear unit, which is intended to convert a speed of drive unit 160 into a speed of tool receptacle 172 and/or to reverse a rotational direction. The handle is situated at an angle to the base body on one side of the base body. In an operating state, a user encloses the handle with one or both hands and holds and/or guides handheld power tool 66.

Figure 3:
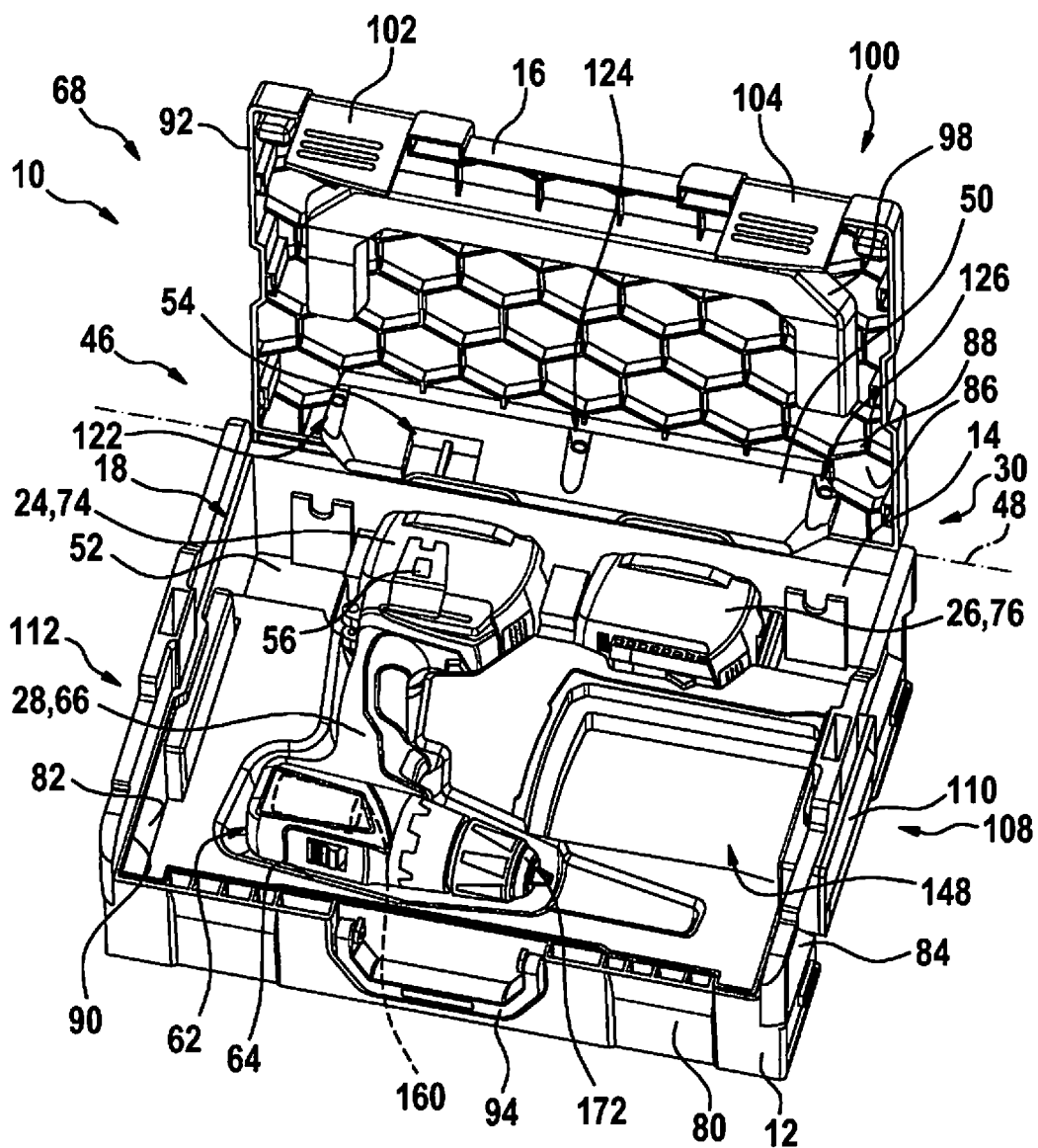
FIG. 3 shows the system including the case insert in a second insertion position and including two further transportation objects.

The handle of handheld power tool 66 has a receptacle which corresponds to the interface unit of rechargeable battery device 70. The interface unit and the receptacle of the handle are intended to be connected to one another with the aid of a plug-in movement. Two of transportation objects 20, 22 of system 68, which are designed as rechargeable battery devices 70, 72, have a lesser height than two further transportation objects 24, 26 designed as rechargeable battery devices 74, 76 (cf. FIG. 3). Rechargeable battery devices 74, 76 which have a greater height also have a greater capacitance. It is possible that rechargeable battery devices 70, 72, 74, 76 have a different power output and/or a different maximum withdrawable current. Rechargeable battery devices 70, 72, 74, 76 have an equal operating voltage. Rechargeable battery devices 70, 72, 74, 76 have an equal length and an equal width. The different insertion positions of case insert 64 correspond to the different sizes of rechargeable battery devices 70, 72, 74, 76. The first insertion positions of case insert 64 are intended for accommodating a unit made of handheld power tool 66 coupled to one of smaller rechargeable battery devices 70, 72. The second insertion position of case insert 64 is intended for accommodating a unit made of handheld power tool 66 coupled to one of larger rechargeable battery devices 74, 76.

In a method for inserting transportation objects into handheld tool case 10, the closing force is converted into the positioning force during the closing movement. A handheld power tool 66 coupled to a rechargeable battery device 70, 74 and a further rechargeable battery device 72, 76 or solely two rechargeable battery devices 70, 72, 74, 76 are inserted into the receptacles of further positioning means 52. Active surfaces 44, which face toward bottom wall 78, on widenings 158 of transportation objects 20, 22, 24, 26, which are designed as rechargeable battery devices 70, 72, 74, 76, come into contact with corresponding active surfaces 40 of positioning unit 30, which are situated on positioning means 52 attached to bottom wall 78 of base unit 12. Due to the effect of gravity on transportation objects 20, 22, 24, 26, transportation objects 20, 22, 24, 26 each slide into the predetermined storage position and approach side wall 14 of base unit 12 formed as the rear wall. In an operating state in which transportation objects 20, 22, 24, 26 do not slide into the predetermined storage position, the user recognizes that transportation objects 20, 22, 24, 26 are not inserted as intended, and/or foreign bodies are located in the area of at least one receptacle. The user removes the foreign bodies and/or corrects an alignment of transportation objects 20, 22, 24, 26. The user swivels cover unit 16 in a closing movement on base unit 12. The cover unit swivels about swivel axis 48 of bearing unit 46, which connects cover unit 16 to base unit 12. Positioning means 50 attached to cover unit 16 comes into contact with transportation objects 20, 22, 24, 26 designed as rechargeable battery devices 70, 72, 74, 76. Active surfaces 32, 34 of positioning unit 30, which are formed as inclined surfaces, come into contact with active surfaces 38, 40 situated on transportation objects 20, 22, 24, 26. Active surfaces 32, 34, 38, 40 slide past one another and convert the movement of active surfaces 32, 34 toward positioning unit 30 into a force on transportation objects 20, 22, 24, 26 in the direction of side wall 14 formed as the rear wall. In an operating state in which transportation objects 20, 22, 24, 26 are situated spaced apart from side wall 14 formed as the rear wall, positioning unit 30 moves transportation objects 20, 22, 24, 26 in the direction of side wall 14. Positioning unit 30 moves each of transportation objects 20, 22, 24, 26 in the direction of a predetermined charging position. In the present exemplary embodiment, cover unit 16 and positioning means 50, 52 are formed to be elastic. Cover unit 16 and positioning means 50, 52 are slightly deformed during the closing movement by the contact with transportation objects 20, 22, 24, 26 and generate a clamping force acting as a closing force. Positioning unit 30 converts the closing force into a clamping force on transportation objects 20, 22, 24, 26. The clamping force presses charging side 116 of transportation objects 20, 22, 24, 26 against side wall 14 of base unit 12, which is formed as the rear wall.

Figure 8:
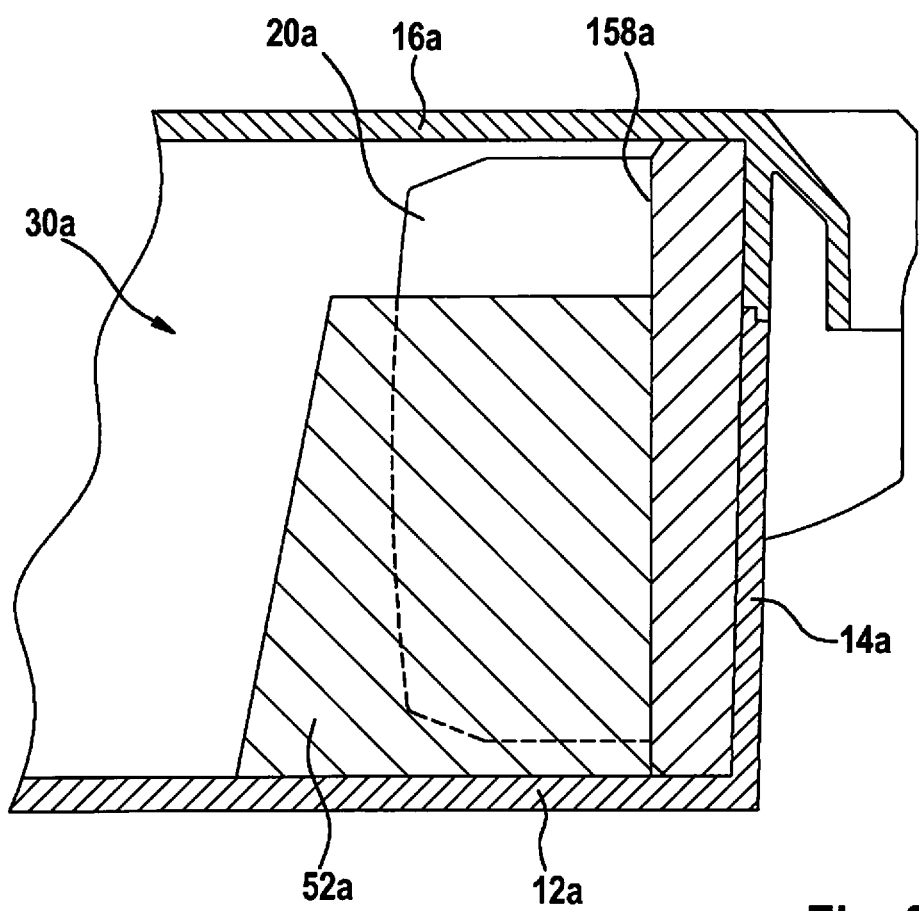
FIG. 8 shows a section through another exemplary embodiment of the handheld tool case including a receptacle for a bulge of the rechargeable battery device.

FIG. 8 shows another exemplary embodiment of the present invention. The following descriptions and the drawings are essentially restricted to the differences between the exemplary embodiments, reference basically also being able to be made to the drawings and/or the description of the other exemplary embodiments, in particular of FIGS. 1 through 7, with respect to identically identified components, in particular with respect to components having identical reference numerals. To differentiate the exemplary embodiments, letter a is appended to the reference numerals of the exemplary embodiments in FIG. 8.

FIG. 8 shows a handheld tool case 10a, which is intended for transportation and/or storage of a transportation object 20a situated in handheld tool case 10a. Handheld tool case 10a includes a base unit 12a, which is formed as a bottom unit. Base unit 12a is formed in the shape of an open cuboid and includes a bottom wall and four side walls 14a, which are situated essentially perpendicularly to the bottom wall. Handheld tool case 10a furthermore includes a cover unit 16a, which is intended to directly delimit, with base unit 12a, a case interior for storage and/or transportation of transportation object 20a. One of side walls 14a is intended to delimit a storage area of transportation object 20a in a charging position for an electrical charging process of transportation object 20a.

Handheld tool case 10a includes a positioning unit 30a, which is intended to move transportation object 20a toward side wall 14a and/or align it in relation to side wall 14a. Positioning unit 30a includes a positioning means 52a, which is intended to cooperate with transportation object 20a for positioning and/or to hold the transportation object in the charging position. Positioning means 52a forms, with side wall 14a, two receptacles, for one holding element each of transportation object 20a. The receptacle has a trapezoidal cross section. The receptacle is in the form of a prism. The receptacle widens in a direction parallel to side wall 14a from a bottom wall toward cover unit 16a. The holding elements are formed in the form of a widening of transportation object 20a. The holding elements are formed as two opposing bulges. A shape of the bulges corresponds in each case to a shape of the receptacles. The positioning means includes an active surface which is formed as an inclined surface in relation to side wall 14a. Positioning means 52a forms, together with transportation object 20a, a wedge drive and is intended, at least during an insertion movement, to move transportation object 20a toward side wall 14a and/or align it in relation to side wall 14a.

What is claimed is:

1. A handheld tool case, comprising:
   at least one base unit which includes a bottom wall and at least one side wall, wherein the at least one side wall is configured to be transmissive for an inductive energy transmission;
   at least one cover unit, which, together with the at least one base unit, indirectly or directly delimits a case interior for at least one of storage and transportation of at least one transportation object, wherein the at least one transportation object is configured for receiving energy inductively; and
   a positioning unit which, in at least one operating state, during a closing movement between the at least one base unit and the at least one cover unit, is configured to convert a closing force into a positioning force on the at least one transportation object, the positioning force having at least one essential component in a direction of the at least one side wall to place the at least one transportation object at a predetermined inductive charging position, wherein the positioning unit includes a plurality of active surfaces, wherein a first of the plurality of active surfaces and a second of the plurality of active surfaces are each formed as an inclined surface and each has a surface normal having a component in the direction of the at least one side wall, and a third of the plurality of active surfaces has a surface normal which, in a closed state of the at least one cover unit, is situated in parallel to the at least one side wall.

2. The handheld tool case according to claim 1, wherein the positioning unit is configured to at least one of move the at least one transportation object toward the at least one side wall and align the at least one transportation object in relation to the at least one side wall.

3. The handheld tool case as recited in claim 1, wherein the positioning unit, in at least one operating state, during a closing movement between the at least one base unit and the at least one cover unit, is configured to convert a closing force into a clamping force on the at least one transportation object, the clamping force having at least one essential component in the direction of the at least one side wall.

4. The handheld tool case as recited in claim 1, wherein the plurality of active surfaces are configured to cooperate with a corresponding active surface of the at least one transportation object.

5. The handheld tool case as recited in claim 1, further comprising:
a bearing unit which includes a swivel axis, about which the at least one cover unit and the at least one base unit are swivelably supported in relation to one another for the closing movement.

6. The handheld tool case as recited in claim 5, wherein the positioning force has an essential component oriented in a radial direction in relation to the swivel axis.

7. The handheld tool case as recited in claim 1, wherein the positioning unit includes at least one positioning element which is attached to the at least one cover unit in an installed state.

8. The handheld tool case as recited in claim 7, wherein the at least one positioning element includes at least one recess for accommodating an object.

9. The handheld tool case as recited in claim 7, wherein the at least one positioning element is designed as a bar.

10. The handheld tool case as recited in claim 7, wherein the positioning unit has at least one positioning element which is attached to the at least one base unit in an installed state.

11. The handheld tool case as recited in claim 1, wherein the positioning unit includes at least one indication element which is configured to indicate to a user a predetermined storage position of the at least one transportation object.

12. The handheld tool case as recited in claim 1, further comprising:
an at least partially adjustable case insert which is configured for storing a handheld power tool.

13. A system, comprising:
at least one transportation object, wherein the at least one transportation object is configured for receiving energy inductively; and
a handheld tool case including at least one base unit which includes a bottom wall and at least one side wall, at least one cover unit, which, together with the at least one base unit, indirectly or directly delimits a case interior for at least one of storage and transportation of the at least one transportation object, and a positioning unit which, in at least one operating state, during a closing movement between the at least one base unit and the at least one cover unit, is configured to convert a closing force into a positioning force on the at least one transportation object, the positioning force having at least one essential component in a direction of the at least one side wall to place the at least one transportation object at a predetermined inductive charging position, wherein the positioning unit includes a plurality of active surfaces, wherein a first of the plurality of active surfaces and a second of the plurality of active surfaces are each formed as an inclined surface and each has a surface normal having a component in the direction of the at least one side wall, and a third of the plurality of active surfaces has a surface normal which, in a closed state of the at least one cover unit, is situated in parallel to the at least one side wall.

14. The system as recited in claim 13, wherein the at least one transportation object is designed as a rechargeable battery device for an energy supply of a handheld power tool.

15. The system as recited in claim 13, further comprising:
a handheld power tool; and
a rechargeable battery device,
wherein the handheld power tool, while at least mechanically coupled to the rechargeable battery device, is designed to be at least one of transported and stored in the handheld tool case,
wherein the positioning unit includes a plurality of active surfaces, wherein a first of the plurality of active surfaces and a second of the plurality of active surfaces are each formed as an inclined surface and each has a surface normal having a component in the direction of the at least one side wall, and a third of the plurality of active surfaces has a surface normal which, in a closed state of the at least one cover unit, is situated in parallel to the at least one side wall.

16. A method, comprising:
providing at least one transportation object, wherein the at least one transportation object is configured for receiving energy inductively, and a handheld tool case including a bottom wall and at least one base unit which includes at least one side wall, at least one cover unit, which, together with the at least one base unit, indirectly or directly delimits a case interior for at least one of storage and transportation of the at least one transportation object, and a positioning unit which, in at least one operating state, during a closing movement between the at least one base unit and the at least one cover unit, is configured to convert a closing force into a positioning force on the at least one transportation object, the positioning force having at least one essential component in a direction of the at least one side wall to place the at least one transportation object at a predetermined inductive charging position; and
converting the closing force into the positioning force during a closing movement of the handheld tool case,
wherein the positioning unit includes a plurality of active surfaces, wherein a first of the plurality of active surfaces and a second of the plurality of active surfaces are each formed as an inclined surface and each has a surface normal having a component in the direction of the at least one side wall, and a third of the plurality of active surfaces has a surface normal which, in a closed state of the at least one cover unit, is situated in parallel to the at least one side wall.

* * * * *